Patented June 17, 1941

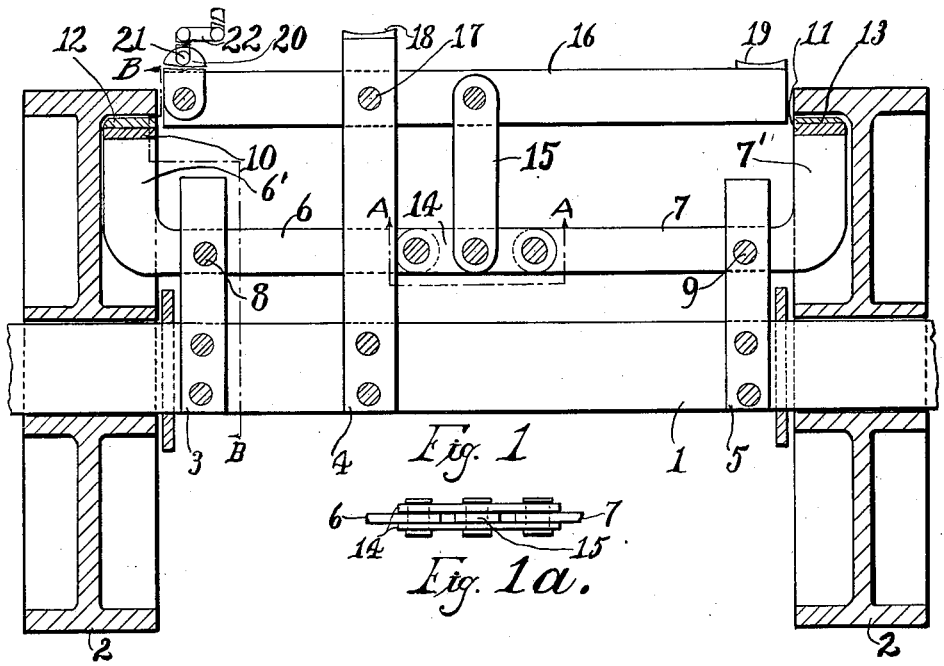
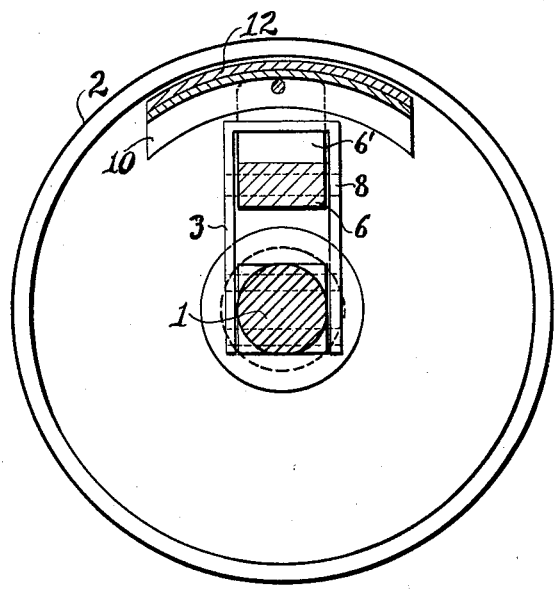

2,246,147

UNITED STATES PATENT OFFICE 2,246,147

BRAKING MECHANISM

Henry J. Smith, Philadelphia, Pa., assignor to The American Pulley Company, Philadelphia, Pa.

Application February 16, 1939, Serial No. 256,631

1 Claim. (Cl. 188—22)

My invention is a simple and sturdy braking mechanism particularly designed for application to rugged but inexpensive vehicles such as baggage trucks, and the like which are commonly operable manually. Such vehicles carry heavy loads proportionately to their size and by my improvements may be effectively braked by the hand or foot of the operator while retaining their normal flexibility of manipulation and operation.

In the preferred embodiment of my invention, lined brake shoes, complementary to braking faces formed by the flanged peripheries of standard wheels, are fixed to the work arms of brake levers of the first class fulcrumed on axes transverse to the axis of rotation of the wheels. The brake levers are arranged in complementary pairs. The power arms of each pair are connected, through an equalizer, with a manually operable handle and pedal.

My improvements further provide means whereby the force of the operator may be imparted by a simple and short movement of his hand or foot to effect the pull or thrust required for brake application. Such force may be exerted by the hand adjacent to the manipulating handles of the vehicle without impeding the steering thereof.

The characteristic features and advantages of my improvements will further appear from the following description and the accompanying drawing in illustration of various embodiments of my invention.

In the drawing, Fig. 1 is a top plan view, partly in section, showing a form of my braking mechanism applied to the running gear of a two-wheel hand truck and having a single expanding brake shoe per wheel operated by a thrust on an equalizer connecting the power arms of the brake levers;

Fig. 1a is a fragmentary side elevation on the line A—A of Fig. 1;

Fig. 2 is an irregular transverse sectional view taken on the line B—B of Fig. 1.

In Figs. 1, 1a and 2, an embodiment of my braking mechanism is shown in conjunction with an axle 1 on which are journalled the flanged wheels 2 of an ordinary two-wheel hand truck. In accordance with my improvements, yoke bars 3, 4 and 5 are bolted to the axle 1 and project substantially horizontally therefrom in the lowered position of the hand truck. Brake-levers of the first class 6 and 7 are fulcrumed on axes transverse to the axis of the axle 1 by being journaled respectively on pins 8 and 9 secured in the yokes 3 and 5. The bent work arms 6' and 7' of the levers are engaged between and pinned to flanged brake shoes 10 and 11 respectively. The brake shoes preferably have faces forming circular segments with brake lining sections 12 and 13 attached thereto.

The power arms of the brake levers 6 and 7 are pivotally connected by equalizers consisting of parallel links 14. A link 15 pivotally connects the equalizer 14 with a lever 16 which is fulcrumed on a pin 17 fixed in the yoke bar 4. The forward end of the bar 4 forms a foot-pedal 18 to facilitate thrusting the nose of the truck under a load when up-ended.

A foot-pedal 19 is fixed to the lever 16 beyond its connection with the link 15, and a pivoted link 20 and flexible tension member 21 connect the opposite end of the lever 16 with a bell-crank handle 22 which is journalled on the handle of the truck adjacent the grip thereof (not shown). The member 16 may thus be used as a lever of the first class by applying power through the link 20, and may be used as a lever of the second class by applying power through the pedal 19.

To apply the brakes when the truck is in normal running position, the grip of the bell-crank 22 is pressed by the hand of the trucker toward the handle of the truck to rock the bell-crank 22 on its fulcrum and apply a pull through the tension member 21 and link 20 to one end of the lever 16. The points of connection of the links 15 and 20 with the lever 16 are on opposite sides of the fulcrum 17 thereof, and the point of connection of the link 20 may be more distant from the fulcrum than is the point of connection of the link 15. The rocking of the lever 16 causes the link 15 and equalizer 14 to exert a thrust on the power arms of the levers 6 and 7. The points of application of power to the levers 6 and 7 are on opposite sides of the fulcrums 8 and 9 from the points where the work is to be done by the brakes, and the length of the power arms of the levers 6 and 7 is greater than the length of the work arms 6' and 7' thereof. The power applied to the grip of the bell-crank 22 is therefore multiplied by the leverage train through which it is transmitted to the brakes, and forces the brake lining tightly against the inner surfaces of the flanged wheels 2 to retard or halt the rotation thereof.

When the handles of the hand truck are so elevated that it is inconvenient to apply hand pressure to the grip of the bell-crank 22, foot pressure may be applied to the foot pedal 19 of the lever 16; such point being more remote from the fulcrum 17 than is the point of connection of the link 15.

While in transmitting power to the link 15 from the foot pedal 19 the lever 16 acts as a lever of the second class, and when power is transmitted to the link 15 from the grip of the bell-crank 22 the lever 16 acts as a lever of the first class, in either case the leverage may be and preferably is so designed that the same amount of braking force may be applied from either the foot pedal 19 or the grip of the bell-crank 22 to the brakes.

Having thus described my invention, I claim:

The combination with a pair of wheels having braking faces rotatable about an axis, of brake levers for the respective wheels fulcrumed on axes extending transversely to the axis of said wheels, brakes on the work arms of the respective levers and rocking into engagement with the respective braking faces of said wheels, equalizing means connecting the power arms of said levers and means for applying power to said equalizing means and including a hand operable bell crank, a lever having a foot pedal thereon, a tension member connecting said bell crank and lever, and a link connecting said last named lever, between its fulcrum and foot pedal, with said equalizing means.

HENRY J. SMITH.